United States Patent Office 3,332,455
Patented July 25, 1967

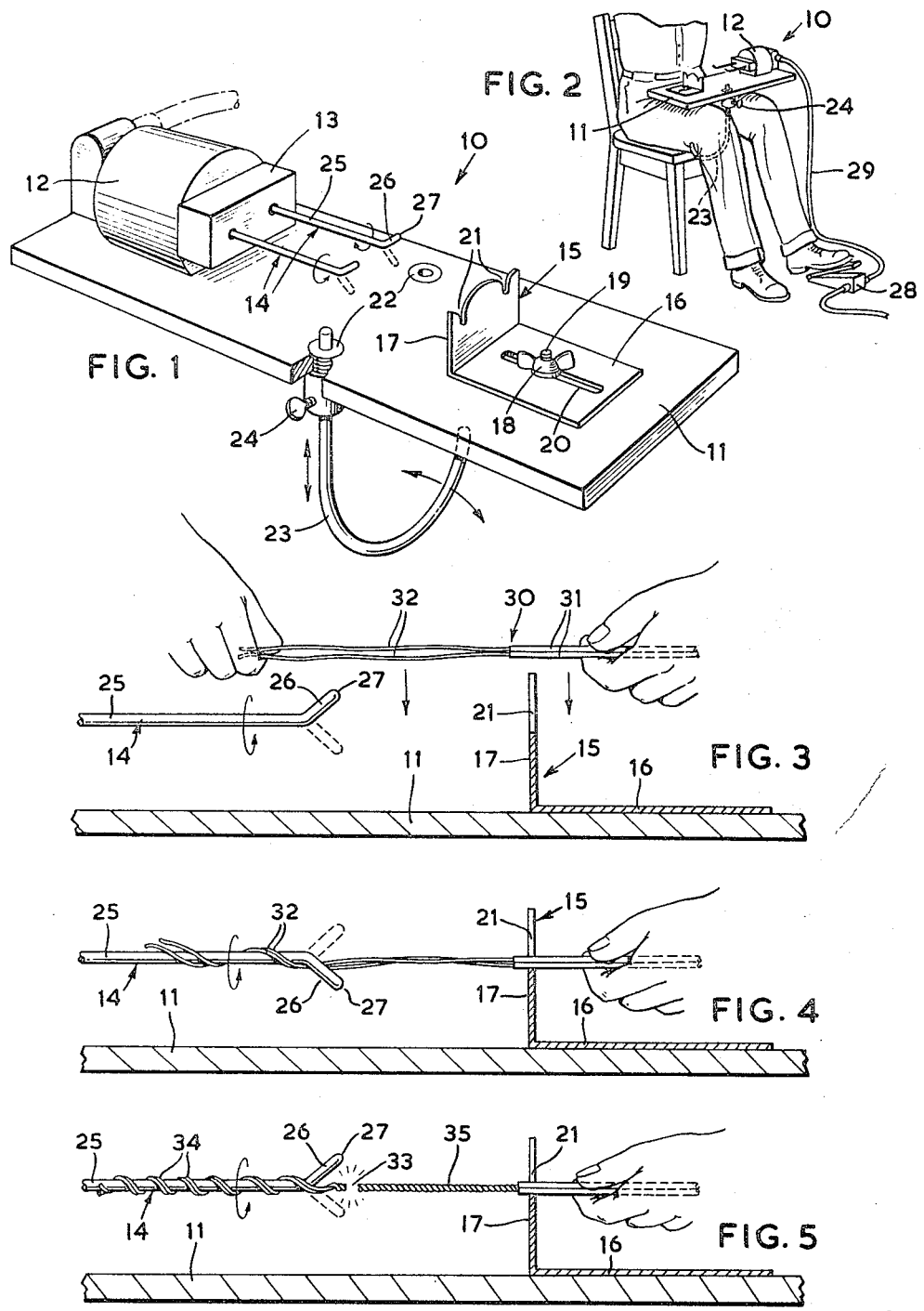

3,332,455
METHOD AND APPARATUS FOR
SPLICING WIRES
James A. Miller, 57 Parkdale Drive, Thorold,
Ontario, Canada
Filed Sept. 28, 1964, Ser. No. 399,739
Claims priority, application Canada, Apr. 17, 1964,
900,594
10 Claims. (Cl. 140—115)

This invention relates to the art of splicing of wires. More particularly, this invention relates to the splicing of the ends of a plurality of cables by twisting the stripped ends thereof together to quickly form an electrical connection therebetween which is comparable in its electrical characteristics to a soldered connection.

Cables are commonly spliced in the field by manually twisting the stripped ends of the cables together and then dipping the twisted ends in solder. This method is time consuming. Further, this method is somewhat hazardous, in view of the necessity of working with a pot of molten solder.

In accordance with this invention, there is provided wire twisting apparatus which may be used in the field or in the shop, and which is capable of splicing two or more wires by a twisting action alone to form an electrical connection between the wires which is comparable in its electrical characteristics to the prior art type of manually spliced, dip-soldered connection.

In addition to the foregoing, very little skill is required on the part of an operator to splice wires proficiently using apparatus embodying this invention. Thus, in emergencies, linesmen and other persons not skilled in the wire splicing art can be quickly trained to splice wires using apparatus embodying this invention. In addition, it has been demonstrated that wires can be spliced considerably more quickly by practising this invention than by the aforementioned prior art technique, thus saving the valuable time of skilled workmen and reducing out of service time caused by cable breaks.

Apparatus embodying this invention comprises a shaft which terminates in a bent end, which itself is straight, but which is inclined at an angle to another straight part of the shaft, the two parts of the shaft lying in a common flat plane. Means are provided for rotating the shaft about the longitudinal axis of the other part thereof.

Figure 6:
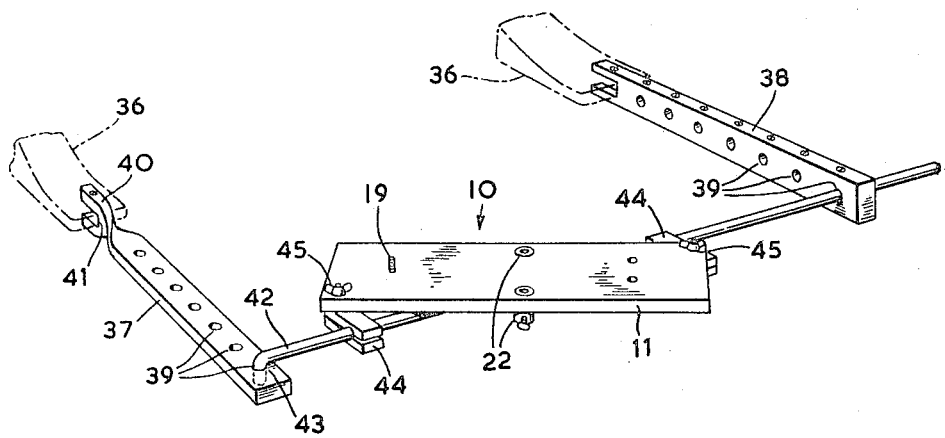
Figure 7:
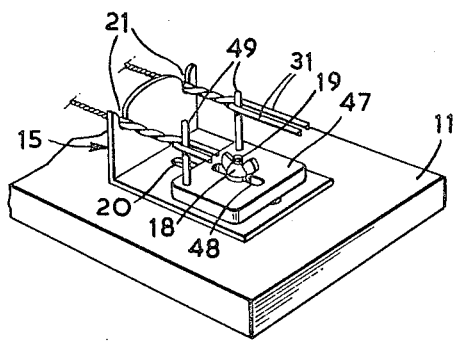

This invention will become more apparent from the following detailed disclosure, taken in conjunction with the appended drawings, in which:

FIGURE 1 is a perspective view of wire splicing apparatus embodying this invention, FIGURE 2 illustrates one method of holding the apparatus when it is in use, FIGURES 3 to 5 inclusive show various steps in practicing a method embodying this invention for splicing together the stripped ends of insulated electrical conductors, i.e. cables, FIGURE 6 illustrates apparatus for supporting the wire splicing apparatus of FIGURE 1, and FIGURE 7 illustrates a twist control attachment which may be employed as part of wire splicing apparatus embodying this invention.

Referring to FIGURE 1, there is shown a wire splicer 10 which consists of a base member 11 of generally rectangular configuration on which is mounted a motor 12. Motor 12 may be any one of a number of different types, but, most preferably, is an air motor. For field use an electric motor operated on A.C. or from a 6 or 12 volt D.C. battery may be substituted for motor 12 or even a gasoline engine could be used. Positioned at one end of motor 12 is a gear reduction unit 13 which is driven by the output shaft (not shown) of motor 12. Projecting through the housing of gear reduction unit 13 and driven by the gears therein in the directions shown by the arrows in FIGURE 1 are two shafts 14.

Also supported on base member 11 is a wire guide 15 which has a foot 16 thereof lying flat against base member 11 and a wall 17 thereof extending perpendicular to base member 11 and to foot 16 of the wire guide. Wire guide 15 may be moved closer to or further away from shafts 14 by loosening a wing nut 18 threaded on a stud 19, which is secured to base member 11, and which projects through an elongated slot 20 in foot 16 of wire guide 15, and by sliding wire guide 15 to the desired position after wing nut 18 has been so loosened. After wire guide 15 has been located in a desired position, wing nut 18 is tightened on stud 19.

It will be seen that wall 17 of wire guide 15 has notches 21 therein which are aligned with shafts 14. As best shown in FIGURE 3, notches 21 terminate just below the axes of rotation of shafts 14 and open outwardly from the bottoms of the notches to facilitate the insertion of insulated electrical conductors into the notches. The width of each notch 21 at the bottom thereof preferably is about equal to the diameter of an insulated electrical conductor to be inserted in the notch.

Depending downwardly from base member 11 and threadably engaged therewith are internally threaded nipples 22. Threadably engaged in nipples 22 are leg hooks 23 which may be adjusted in position by turning the leg hooks within the nipples. Each nipple has a thumb screw 24 which is employed to hold the leg hook threadably engaged in the nipple fixed in position once the leg hook has been properly adjusted.

It will be seen that each shaft 14 has a straight portion 25, and that each shaft is bent at the end thereof remote from motor 12 to form another single straight portion 26. Each shaft 14 and its associated straight portion 26, which, incidentally, is formed integrally with straight portion 25 of shaft 14, terminates at a point 27 which is spaced from the longitudinal axis of straight portion 25 by the length of straight portion 26. It will be seen that straight portions 26 each are inclined at an obtuse angle to its respective straight portion 25, with which it is continuous. It also is important to note that the longitudinal axis of each straight portion 26 lies completely in a common flat plane with the longitudinal axis of its associated straight portion 25.

While wire splicer 10 illustrated in FIGURES 1 and 2 has been shown as having two shafts 14, and while such a wire splicer can twist together the ends of two or more wires with each shaft 14, it would not depart from this invention to employ only one shaft 14, as shown in FIGURES 3–5, or to make use of more than two shafts.

One method of using wire splicer 10 is shown in FIGURE 2 where base member 11 rests on the lap of an operator and leg hooks 23 are hooked under the operator's leg. The operation of wire splicer 10 is controlled by a foot operated valve 28 positioned in an air hose 29 between a compressed air supply (not shown) and motor 12. Of course, splicer 10 may be permanently mounted on a supporting table, or, for field work, brackets may be secured to base member 11 to permit the wire splicer to be secured to a cable support rack in a manhole or to aerial cable strands.

For example, referring to FIGURE 6 there are shown two hangers 36 which are conventional items used in the telephone industry. Also shown are two bars 37 and 38, each with apertures 39 therein. Bar 37 has its end 40 twisted at right angles to the remainder of the bar. Bar 37 has one end 40 slotted at 41 to fit onto one hanger 36 to which it is detachably fixed by a screw or the like. Bar 38 also is slotted at one end to fit onto the other hanger 36 to which bar 38 is similarly detachably affixed.

A rod 42 bent at right angles at 43 has one end thereof inserted in an opening 39 in bar 38 and the other end inserted in an opening 39 in bar 37. Screws or the like may be employed to detachably secure rod 42 to bar 38. Wire splicing device 10, only the base member 11 of which is shown, is fastened to rod 42 by brackets 44 which are clamped or released by wing nut and bolt assemblies 45.

Referring in particular to FIGURES 3 to 5 for a description of the operation of a wire splicer embodying this invention and a method embodying this invention, there are shown two cables 30 each of which has the insulation 31 thereof stripped from one end to expose conductors or wires 32. Before cables 30 are moved to the position of FIGURE 3, rotation of shaft 14 is commenced by depressing foot valve 28. Cables 30 then are moved into notch 21 with the cables being held parallel to the shaft 14 aligned with notch 21. It will be noted that cables 30 are placed in notch 21 so that about one-quarter of an inch of insulation 31 projects beyond the side of wall 17 of wire guide 15 adjacent to shaft 14. It also will be noted that the free ends of wires 32 are held in the operator's right hand while the parts of the cables on the side of wall 17 of wire guide 15 remote from shaft 14 are held in the operator's left hand.

Cables 30 are moved in the direction shown by the arrows in FIGURE 3 and wires 32 are engaged by the rotating straight portion 26 of shaft 14. It should be noted that the free ends of the wires are held loosely, as shown in FIGURE 3, in the operator's right hand until several turns have been wound on straight portion 25 of shaft 14, as shown in FIGURE 4. Eventually rotation of shaft 14 will pull the free ends of wires 32 from the operator's right hand. The rotation of shaft 14 twists wires 32, and eventually breakage thereof occurs at point 33 (FIGURE 5). During the whole of the aforementioned operation the cables remain held in the left hand of the operator and thus are prevented from twisting beyond this point.

It should be noted that shafts 14 should be rotating at speeds in excess of 1000 r.p.m., preferably between about 5000 and 6000 r.p.m. in order to ensure satisfactory "adhesion" of wires 32 to shafts 14.

It is not necessary to remove the parts 34 of wires 32 wound up on straight portion 25 of shaft 14 before repeating the foregoing operation. However, after a number of cables have been so spliced, the scrap parts 34 thereof can be removed from shaft 14 easily by pushing them over end 27 of shaft 14, and this operation is greatly facilitated by the fact that portion 26 of shaft 14 is straight. The nature of the splice between cables 30 is shown at 35 (FIGURE 5) from which it will be seen that wires 32 are tightly twisted together.

While it is preferred that shaft 14 be rotating before wires 32 are brought into engagement with straight portion 26 thereof, this is not essential, and rotation of shaft 14 may be delayed until contact between wires 32 and portion 26 of shaft 14 is effected.

Referring to FIGURE 7, there is shown a twist control attachment having a base plate 47 with an elongated slot 48 extending therethrough. Extending upwardly from base plate 47 in alignment with notches 21 are pins 49.

The twist control attachment is mounted to foot 16 of wire guide 15 and is secured by the same wing nut 18 as secures wire guide 15. The twist control attachment may be moved with or relative to wire guide 15 by loosening wing nut 18.

When the twist control attachment is used, cables 30 to be twisted together are positioned on either side of a pin 49, as shown in FIGURE 7, and it will be found that pin 49 prevents twisting of the cables on the side of pin 49 remote from wall 17, cables 30 still being held in the operator's hand on this side, of course. The distance between the ends of shafts 14 and pins 49 determines the length of the twist.

While preferred embodiments of this invention have been disclosed herein, those skilled in the art will appreciate that changes may be made therein without departing from the spirit and scope of this invention as defined in the appended claims.

What I claim as my invention is:

1. Apparatus for splicing the ends of a plurality of wires by twisting said ends together, said apparatus comprising a shaft, said shaft having a first straight portion, said shaft being bent at one end thereof to form a single second straight portion, said shaft and said second straight portion terminating at a point spaced from the longitudinal axis of said first straight portion by the length of said second straight portion, said second straight portion and said first straight portion being continuous with each other, said second straight portion being inclined at an angle to said first straight portion with the longitudinal axes of said first and second straight portions lying in a common flat plane, means for rotating said shaft about said longitudinal axis of said first straight portion, a base member, said means for rotating said shaft being mounted on said base member and comprising an air motor and a gear reduction unit, said air motor being connected to drive said gear reduction unit, said gear reduction unit being connected to drive said shaft, a wire guide slidably mounted on said base member but adapted to be fixed in position thereon, said wire guide having a notch therein adapted to receive wires to be twisted together, said wire guide being spaced from said second straight portion with the notch in said wire guide aligned with said first straight portion, the bottom of the notch in said wire guide being substantially aligned with said longitudinal axis of said first straight portion, said wire guide being slidable towards and away from said shaft, at least one leg hook depending from said base member and adapted to hook under the leg of an operator when said base member is supported on the lap of the operator, an air hose connected to said air motor and a foot controlled valve adapted to be operated by the foot of an operator for controlling the air supplied to said air motor through said air hose.

2. Apparatus according to claim 1 including a wire guide having a notch therein adapted to receive wires to be twisted together, said wire guide being spaced from said second straight portion with the notch in said wire guide aligned with said first straight portion.

3. Apparatus according to claim 2 including a twist control device, said twist control device comprising a pin spaced from said shaft and disposed in non-parallel relationship with the longitudinal axis of said first straight portion thereof, said twist control device being mounted on said wire guide with said pin on the side of said notch remote from said second straight portion.

4. Apparatus according to claim 1 including a twist control device, said twist control device comprising a pin spaced from said shaft and disposed in non-parallel relationship with the longitudinal axis of said first straight portion thereof.

5. Apparatus for splicing the ends of a plurality of wires by twisting said ends together, said apparatus comprising a shaft, said shaft having a first straight portion, said shaft being bent at one end thereof to form a single second straight portion, said shaft and said second straight portion terminataing at a point spaced from the longitudinal axis of said first straight portion by the length of said second straight portion, said second straight portion and said first straight portion being continuous with each other, said second straight portion being inclined at an angle to said first straight portion with the longitudinal axes of said first and second straight portions lying in a common flat plane, means for rotating said shaft about said longitudinal axis of said first straight portion, a base member, said means for rotating said shaft being mounted on said base member, and a wire guide slidably mounted on said base member but adapted to be fixed in position thereon, said wire guide having a notch therein adapted to receive wires to be twisted together, said wire guide being spaced from said second straight portion with the notch in said wire guide aligned with said first straight portion, said wire guide being slidable towards and away from said shaft.

6. Apparatus according to claim 5 wherein said wire guide is slidable towards and away from said shaft.

7. Apparatus according to claim 5 wherein said second straight portion is inclined at an obtuse angle to said first straight portion.

8. Apparatus according to claim 7 including at least one leg hook depending from said base member and adapted to hook under the leg of an operator when said base member is supported on the lap of the operator.

9. A method for splicing the ends of a plurality of wires which comprises; providing a shaft having a first straight portion and bent at one end to form a single second straight potrion, said shaft and said second straight portion terminating at a point spaced from the longitudinal axis of said first straight portion, said second straight portion and said first straight portion being continuous with each other, said second straight portion being inclined at an angle to said first straight portion with the longitudinal axes of said first and second straight portions lying in a common flat plane, holding said wires adjacent the free ends thereof and also at a point spaced therefrom, moving said wires while so held into engagement with said second straight portion of said shaft, said wires engaging said second straight portion between said free ends and said point, said free ends being held adjacent said first straight portion of said shaft, rotating said shaft about the longitudinal axis of said first straight portion so that said second straight portion catches and twists said wires, continuing to hold said wires adjacent said free ends thereof until said wires are wound on said shaft, continuing to hold said wires at a point spaced from said free ends and said shaft until said wires are twisted sufficiently to break, and continuing rotation of said shaft until said wires break.

10. A method for splicing the ends of a plurality of wires which comprises; providing a shaft having a first straight portion and bent at one end to form a single second straight portion, said shaft and said second straight portion terminating at a point spaced from the longitudinal axis of said first straight portion by the length of said second straight portion, said second straight portion and said first straight portion being continuous with each other, said second straight portion being inclined at an angle to said first straight portion with the longitudinal axes of said first and second straight portions lying in a common flat plane, holding said wires adjacent the free ends thereof and also at a point spaced therefrom, rotating said shaft about the longitudinal axis of said first straight portion, moving said wires while so held into engagement with said second straight portion of said rotating shaft so that said second straight portion catches said wires between said free ends and said point and twists said wires, said free ends being held adjacent said first straight portion, continuing to hold said wires adjacent said free ends thereof until said wires are wound on said shaft, continuing to hold said wires at a point spaced from said free ends and said shaft until said wires are twisted sufficiently to break, and rotating said shaft, thereby twisting said wires, until said wires break.

References Cited

UNITED STATES PATENTS 1,681,245  8/1928  Milla et al. _____ 140—115
2,949,939  8/1960  May et al. _____ 140—115

FOREIGN PATENTS 887,554  8/1953  Germany.

WILLIAM J. STEPHENSON, *Primary Examiner.*